United States Patent
Papandreadis

(12) 
(10) Patent No.: US 6,565,038 B2
(45) Date of Patent: May 20, 2003

(54) SUPERSONIC PROPELLERS FOR AIRCRAFTS

(76) Inventor: Elias Papandreadis, 58 Douzinas Str., 18020 Poros (GR)

( * ) Notice: Subject to any disclaimer, the term of this patent is extended or adjusted under 35 U.S.C. 154(b) by 0 days.

(21) Appl. No.: 09/767,246

(22) Filed: Jan. 22, 2001

(65) Prior Publication Data

US 2002/0134885 A1 Sep. 26, 2002

(51) Int. Cl.[7] .............................................. B64C 15/00
(52) U.S. Cl. ........................ 244/12.2; 244/6; 244/23 A; 244/23 C; 244/13; 244/35 A
(58) Field of Search .................... 244/6, 12.3, 12.2, 244/12.5, 23 A, 23 B, 23 C, 23 D, 13, 35 A; 416/93 A, 179, 189

(56) References Cited

U.S. PATENT DOCUMENTS

| | | | | |
|---|---|---|---|---|
| 3,388,878 A | * | 6/1968 | Peterson et al. | 244/12.3 |
| 4,828,203 A | * | 5/1989 | Clifton et al. | 244/12.3 |
| 5,454,531 A | * | 10/1995 | Melkuti | 244/12.6 |
| 5,505,407 A | * | 4/1996 | Chiappetta | 244/12.5 |
| 6,302,652 B1 | * | 10/2001 | Roberts | 416/228 |

* cited by examiner

*Primary Examiner*—J. Woodrow Eldred
(74) *Attorney, Agent, or Firm*—Herbert Dubno

(57) ABSTRACT

The present invention provides one pair or two pairs of horizontal propellers incorporated on the two opposite sides of an aircraft, which propellers by their rotating external blades create through their frontal shell opening a very strong frontal depression, stronger than their drag, providing an horizontal motion subsonic or supersonic, but their main advantage arise from the supersonic speed power requirement which is less than 20% of that of equivalent supersonic aircraft's, with consequent economy of construction, of maintenance and mainly in flight cost, and also a multiple in flight range and obviously respectively decrease of air pollution.

Also if a vertical take-off and landing are required, these propellers by their internal blade could function as radial-flow propeller or blowers until their horizontal speed attains that required to support the aircraft by their wings, then by obstructing the radial-flow of the propeller and increasing the external blades rotation a supersonic speed is attained with the same economical and operational advantages of previous paragraph. And all that with only the present day technology.

10 Claims, 23 Drawing Sheets

SKETCH OF AIR VEHICLE
OF MAX. TAKE-OFF 3000 Kg.
WITH SUPERSONIC PROPELLERS
FRONT VIEW

DEPRESSION IMPELLERS WITHOUT BLOWERS

SKETCH OF AIR VEHICLE
OF MAX TAKE-OFF 17300 Kg.
WITH SUPERSONIC PROPELLERS

FRONT VIEW

DEPRESSION IMPELLERS
WITH BLOWERS

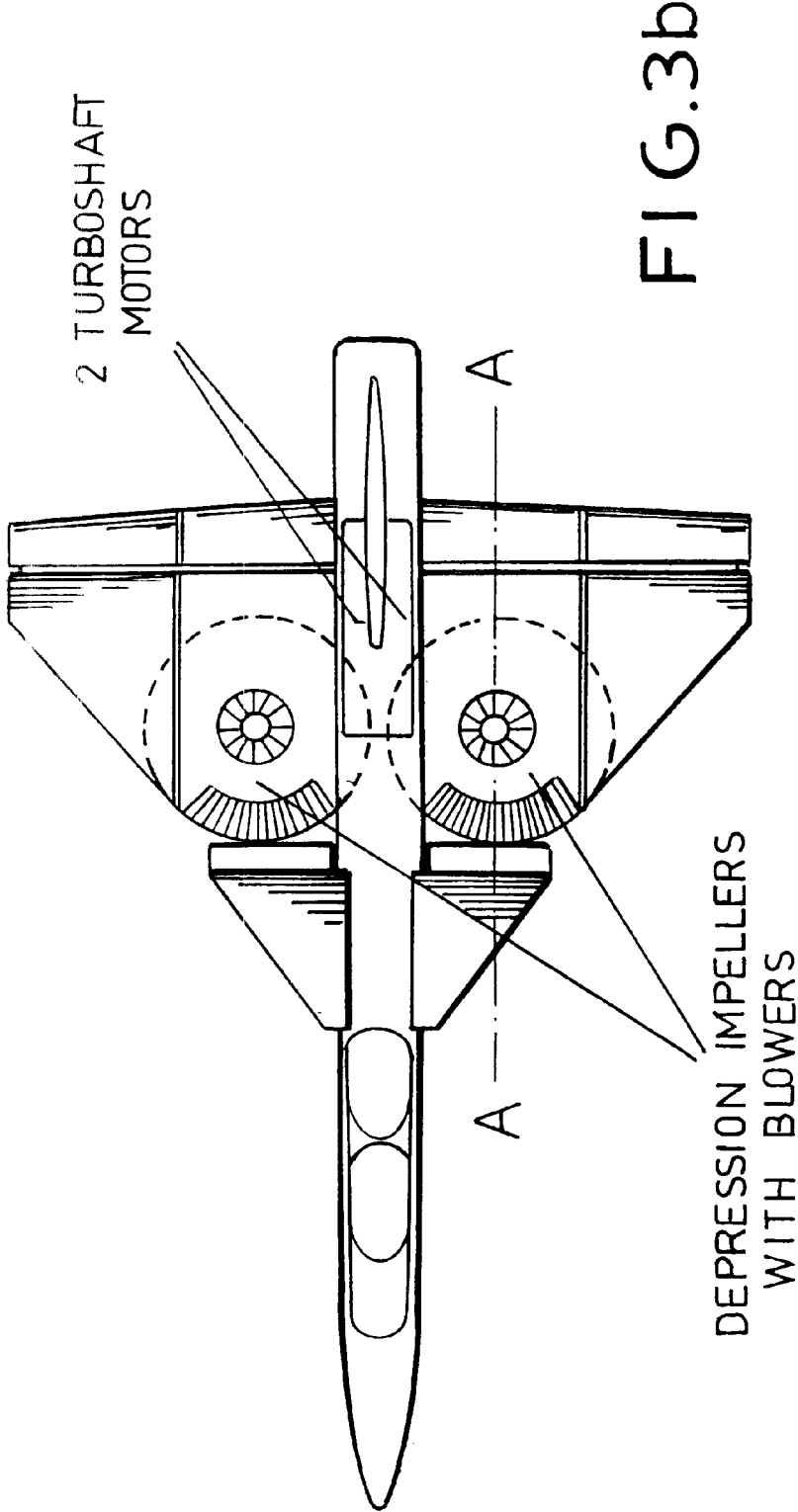

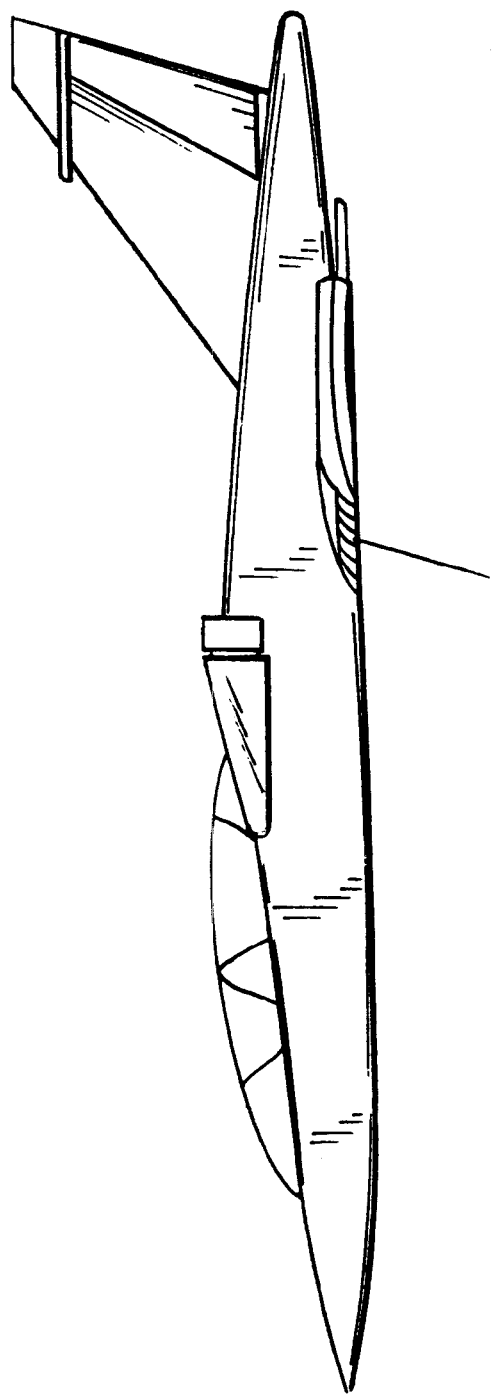

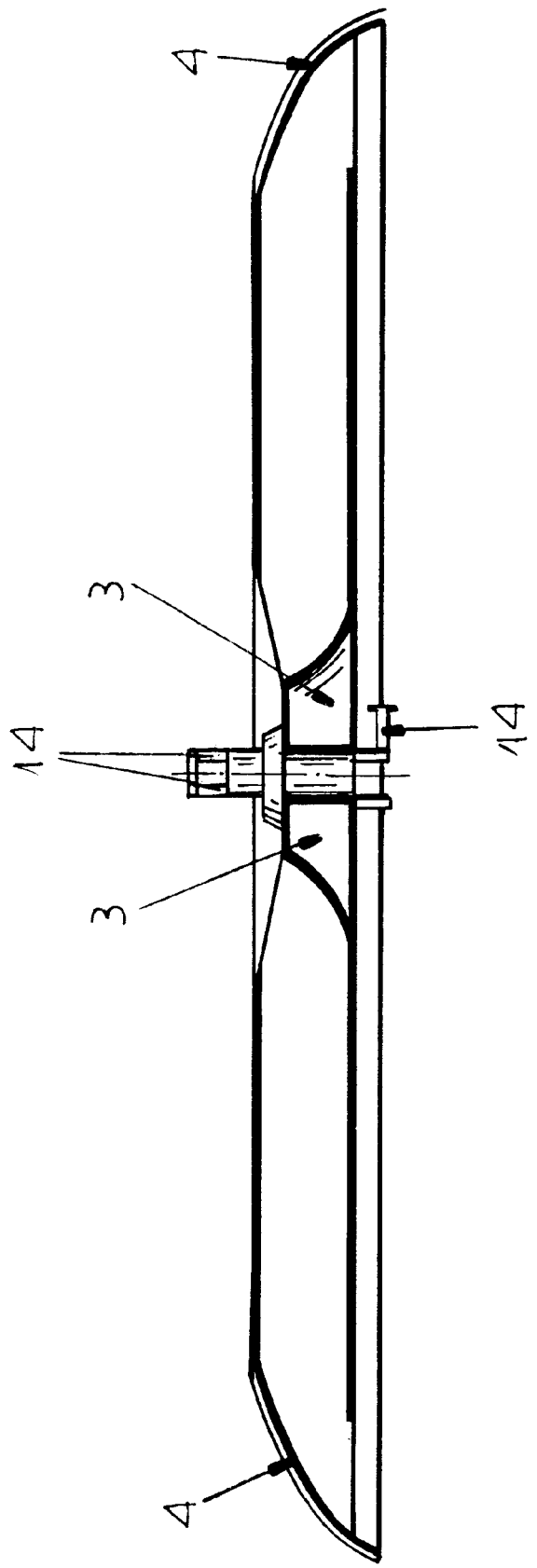

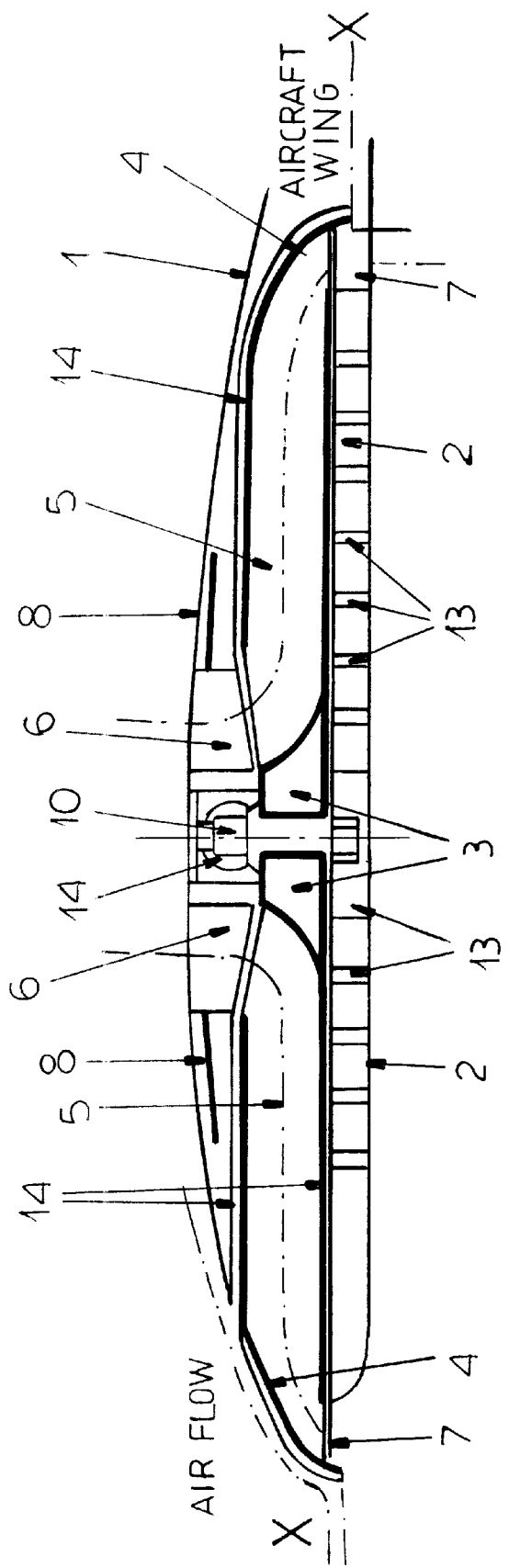

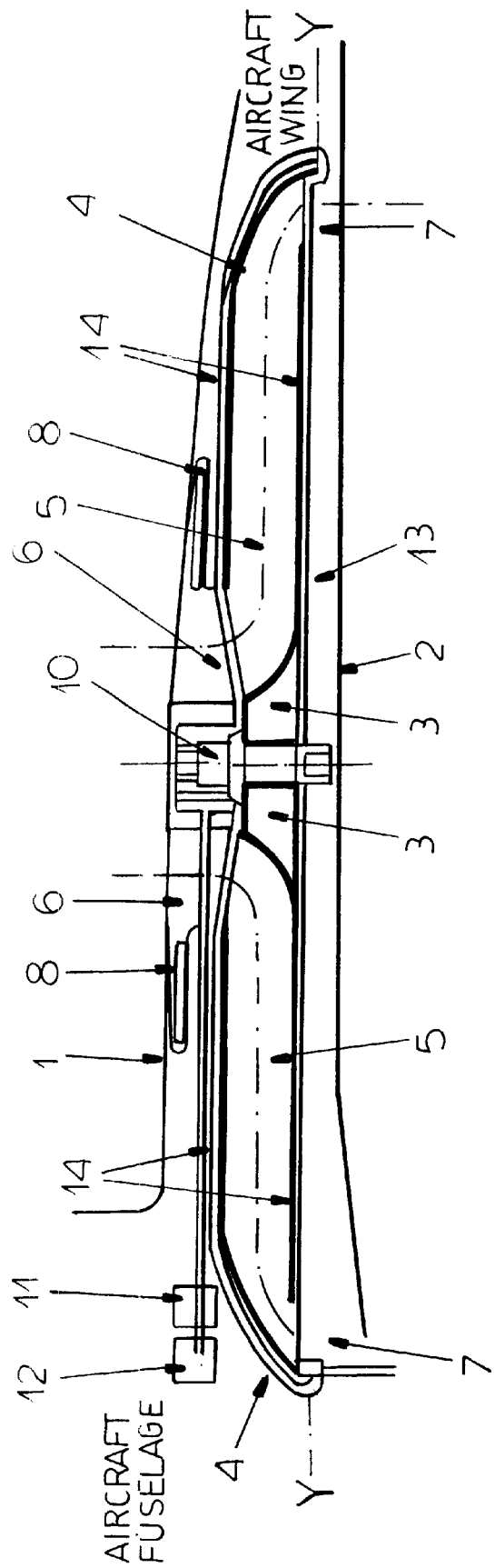

SKETCH OF AIR VEHICLE
OF MAX. TAKE-OFF 3000 Kg.
WITH SUPERSONIC PROPELLERS
SIDE VIEW

DEPRESSION IMPELLERS
WITHOUT BLOWERS

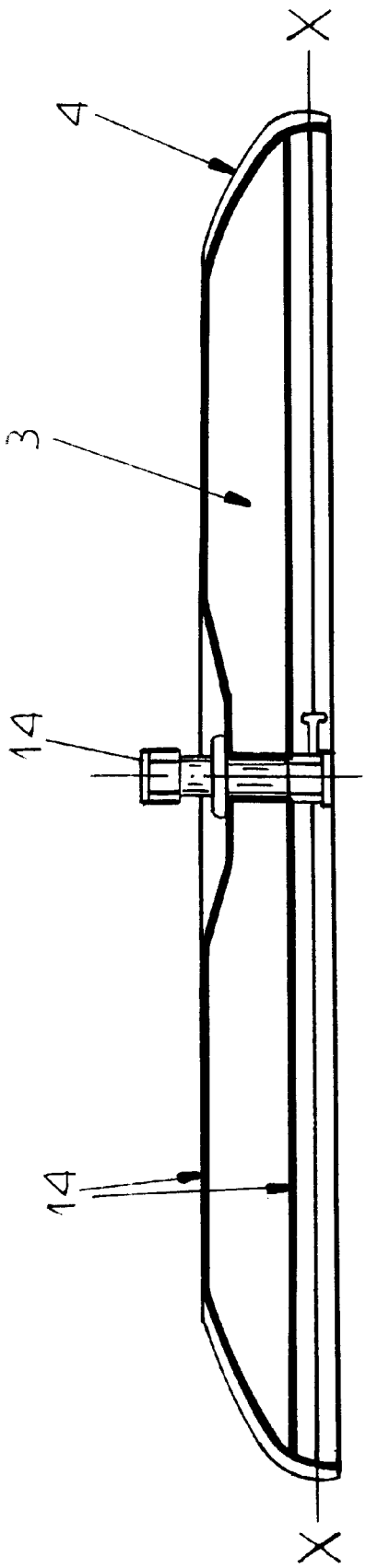

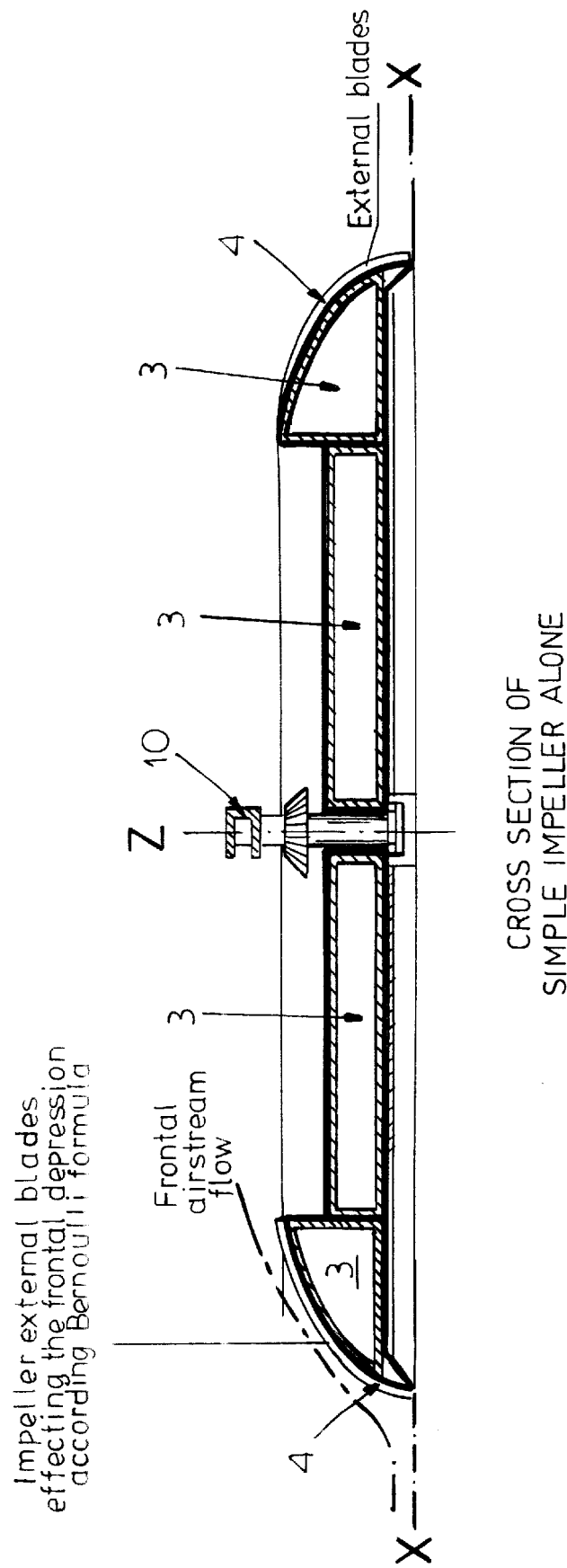
FIG.10.I
CROSS SECTION OF SIMPLE IMPELLER ALONE

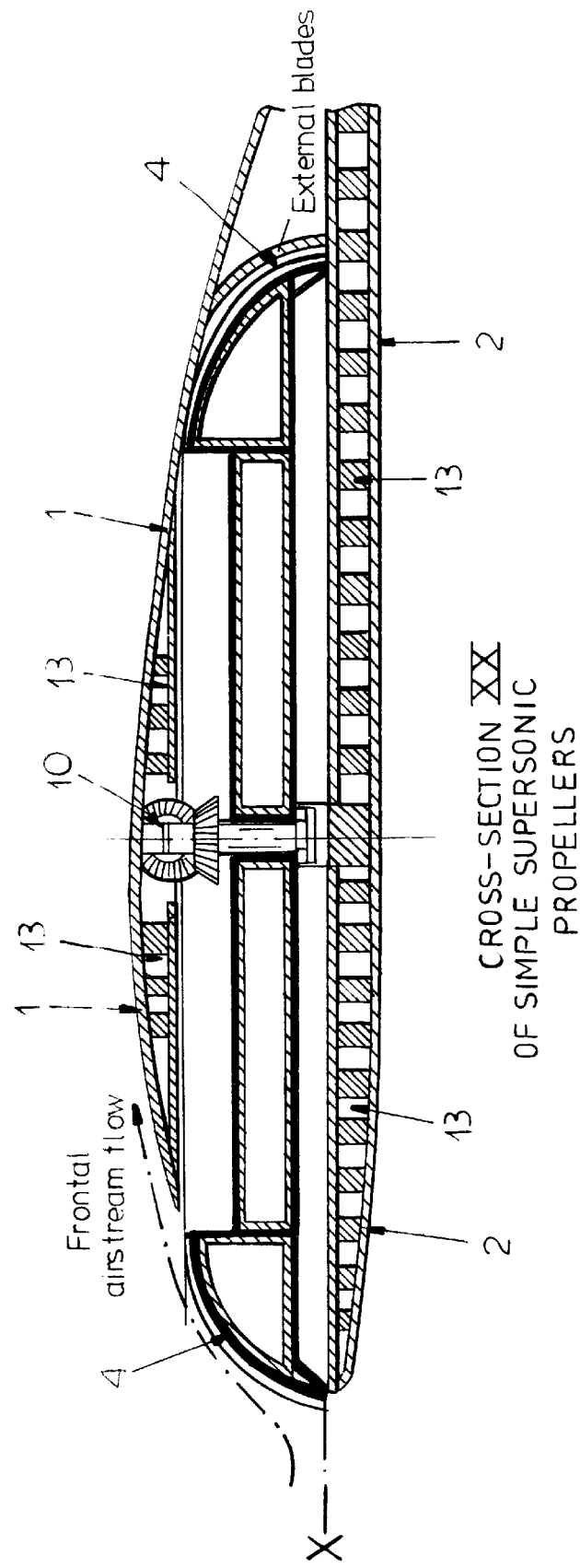
FIG.10.II

CROSS SECTION YY
OF SIMPLE SUPERSONIC PROPELLERS

SUPERSONIC PROPELLERS FOR AIRCRAFTS

CROSS REFERENCE TO RELATED APPLICATION

The present invention relates to the invention disclosed in European Patent EP 0120263 that is incorporated by reference. This Patent model test measurements madden at the Athens Technical University wind tunnel during 1993 (see table 1 of page 2) proved the insufficiency of frontal depression by friction.

The supersonic propeller model test measurements madden on the same wind tunnel during 1994 (see table 2 of page 3) proved the substantial improvement of frontal depression by vertical blades, as shown on FIG. 1 here after.

1. Field of the Invention

The field of the invention is the flight of air-vehicle by frontal depression, more intense than that of rear air stream separation zone, instead of the conventional very strong rear overpressure, which is also more expensive. This aeronautic area has not been explored or exploited even it present very interesting characteristics, especially economical.

The frontal depression is secured by adding in the frontal impact zone an horizontal rotation speed on the thin air boundary layer, eliminating any overpressure on that zone, and without effecting the general air flow around the stream lined air-vehicle fuselage. Theorycaly this is based on the non vector of Bernouilli Theorem $$P + p\frac{v^2}{2} = C$$

2. Description of Prior Art

Air vehicle motion elements can be classified in two broad areas.

The first area includes the axial flow propellers, having a perimeter speed limit of Mach one, and an efficiency factor less than 70% consequently their impulsion speed is only subsonic.

The second area includes the radial flow of multi step turbofans, having a supersonic impulsion speed up to about 2.5 Mach but with an excessive fuel consumption.

SUMMARY OF THE INVENTION

To remedy this drawback the wind-tunnel test measures made on EU 0120263 Patent model of table 1 and of FIG. 1 and of FIG. 2 have been considered, indicating that:

The additional side speed to the frontal air flow by only the smooth surface friction of the rotating impeller proved to be insufficient.

Patented helicoplane model tested mesures dated Apr. 1, 1993, done on air tunnel of the Technical University of Athens.

TABLES no. 1

| U(m/s) | V(m/s) | V/U = 1/RO | D(N) | S(N) | L(N) | R(Nm) | P(Nm) | Y(Nm) |
|---|---|---|---|---|---|---|---|---|
| 0 | 13 | ∞ | 1.12 | 0.02 | −0.36 | −0.05 | −0.61 | −0.17 |
| 10 | 0 | 0 | 5.89 | −0.38 | −9.37 | 0.31 | −0.79 | −0.08 |
| 10 | 20 | 2 | 4.62 | 0.19 | 2.17 | 0.13 | −1.83 | −0.21 |
| 25 | 0 | 0 | 18.07 | −2.05 | 2.16 | 0.70 | −0.85 | −0.27 |
| 25 | 19.5 | 0.78 | 17.60 | −2.06 | 3.60 | 1.06 | −1.01 | −0.33 |
| 35 | 0 | 0 | 31.37 | −3.94 | 23.05 | 2.26 | −1.11 | −0.26 |
| 35 | 20 | 0.57 | 32.72 | −5.31 | 24.11 | 1.81 | −1.64 | −0.46 |

| a/a | U | V | V/U = 1/RO | Re | $C_D$ | $C_S$ | $C_L$ |
|---|---|---|---|---|---|---|---|
| 1 | 0 | 13 | ∞ | 0 | 0 | 0 | 0 |
| 2 | 10 | 0 | 0 | $4 \times 10^5$ | 0.347 | −0.022 | −0.552 |
| 3 | 10 | 20 | 2 | $4 \times 10^5$ | 0.272 | 0.011 | 0.128 |
| 4 | 25 | 0 | 0 | $1 \times 10^6$ | 0.170 | −0.019 | 0.020 |
| 5 | 25 | 19.5 | 0.78 | $1 \times 10^6$ | 0.166 | −0.019 | 0.034 |
| 6 | 35 | 0 | 0 | $1.4 \times 10^6$ | 0.151 | −0.019 | 0.111 |
| 7 | 35 | 20 | 0.57 | $1.4 \times 10^6$ | 0.157 | −0.026 | 0.116 |

| INVERTOR | FLUIDS SECTION | SYMBOLES DEFINITION |
|---|---|---|
| $V_D$ | U | Horizontal speed of the air flow |
| (WR) | V | Perimeter speed of the impeller. |
| $F_x$ | D | Drag |
| $F_y$ | S | Side force |
| $F_z$ | L | Lift |
| $M_x$ | Y | Yaw torque |
| $M_y$ | P | Pitch torque |
| $M_z$ | R | Rotation torque |
| $C_x C_y C_z$ | $C_D C_S C_L$ | Respective coefficients |
| P | N | Power on Watts |

Advanced helicoplane model tested mesures dated Feb. 25, 1994, done on the air tunnel of the Technical University of Athens.

TABLES no 2

| U(m/s) | V(m/s) | D(N) | S(N) | L(N) | R(Nm) | P(Nm) | Y(Nm) | N(W) |
|---|---|---|---|---|---|---|---|---|
| 0.000 | 10.0 | −0.73 | −0.92 | 3.83 | −0.21 | 3.26 | −0.52 | 108 |
| 10.361 | 10.0 | 0.35 | 0.18 | 6.44 | 0.24 | 1.05 | 0.12 | 112 |
| 20.440 | 10.0 | 12.29 | −0.57 | 15.67 | 0.37 | 3.60 | 0.30 | 116 |
| 29.048 | 10.0 | 41.88 | −2.07 | 37.62 | 1.52 | 5.31 | −0.70 | 120 |
| 28.937 | 5.0 | 41.75 | −2.37 | 40.67 | 1.73 | 5.26 | −0.39 | 57 |
| 28.912 | 0.0 | 39.88 | −2.00 | 40.01 | 1.65 | 5.25 | −0.15 | |

TABLES no 2-continued

| | | | | | | | |
|---|---|---|---|---|---|---|---|
| 20.452 | 0.0 | 18.92 | 0.22 | 25.48 | 0.66 | 3.33 | −0.60 |
| 10.078 | 0.0 | 3.92 | −0.47 | 2.89 | 0.01 | 2.78 | −0.61 |

| U(m/s) | V(m/s) | Re | V/U | $C_D$ | $C_S$ | $C_L$ |
|---|---|---|---|---|---|---|
| 0.000 | 10.0 | 0 | — | — | — | — |
| 10.361 | 10.0 | 414440 | 0.965 | 0.019 | 0.010 | 0.354 |
| 20.440 | 10.0 | 817600 | 0.489 | 0.174 | −0.008 | 0.221 |
| 29.048 | 10.0 | 1161920 | 0.344 | 0.293 | −0.014 | 0.263 |
| 28.937 | 5.0 | 1157480 | 0.173 | 0.294 | −0.017 | 0.286 |
| 28.912 | 0.0 | 1156480 | 0.00 | 0.281 | −0.014 | 0.282 |
| 20.452 | 0.0 | 818080 | 0.00 | 0.267 | 0.003 | 0.359 |
| 10.078 | 0.0 | 403120 | 0.00 | 0.228 | −0.027 | 0.168 |

| INVENTOR | FLUIDS SECTION | SYMBOLES DEFINITION |
|---|---|---|
| $V_D$ | U | Horizontal speed of the air flow |
| (WR) | V | Perimeter speed of the impeller. |
| $F_x$ | D | Drag |
| $F_y$ | S | Side force |
| $F_z$ | L | Lift |
| $M_x$ | Y | Yaw torque |
| $M_y$ | P | Pitch torque |
| $M_z$ | R | Rotation torque |
| $C_x C_y C_z$ | $C_D C_S C_L$ | Respective coefficients |
| P | N | Power on Watts |

Accordingly a

1. SIMPLE SUPERSONIC PROPELLER (FIGS. 9.10.11) is constituted by an horizontal streamlined shell of thin profile and reduced drag, having an upper semiellipsoid convex boundary (1) and a lower slightly convex boundary (2) with a central to the axis, supported by bearings, on which is fixed an impeller of semiellipsoid surface (4) full of vertical very dense and of short width (4 mm) blades (4), which secure the side speed of the tangential air layer through the large front opening (4) on the impact area, and the respective frontal depression, according to Bernoulli theorem, creating the horizontal motion which can reach even a supersonic speed. The impeller axis is connected to the motor by cogwheels (10) clutches (11) and gear box (12) permitting the increase of the imperial rotation. The propeller is fixed by rafters (13).

2. COMPOSITE SUPERSONIC PROPELLER (FIGS. 4,5, 6) In order the above mentioned supersonic propeller has to have also lifting capability as a single step blower, is equipped additionally with internal tilted lifting blades (5) on the internal concave site of it, with a circular opening (6) close to the rotation axis equipped with deflector vanes (6) and obstruction vanes (7), (8) permitting the blower to create a vertical air flow. These are closed when the air-vehicle wings attain a wing lifting force equal to the air vehicle weight. And finally it includes the rafters connecting the supersonic propeller to the air vehicle fuselage.

The lower light convex boundary is characterized by a perimeter opening (7) equipped with deflector vanes and the rafters connecting the air vehicle fuselage, to the propeller and its wings.

The rear obstruction vane (8) when closed it reinstates the semi ellipsoid profile of upper propeller shell profile.

3. VTOVL AIR VEHICLE WITH SUPERSONIC PROPELLERS (Composite) A pair of supersonic propellers as in previous paragraph (1), is incorporated on the opposite sides (FIG. 3) of its fuselage with the propellers gravity center, coinciding with the air-vehicle weight gravity center and the wing area surface center. These are connected to the air-vehicle fuselage and the adjacent wings by rafters (13) and with their front totally uncovered. Also a small horizontal axial propeller is to place beyond the air vehicle direction blade, for balancing the yawing during vertical flight.

4. HEAVY VTOVL AIR-VEHICLE WITH SUPERSONIC PROPELLERS (Composite) This has two pairs of supersonic propellers as previous paragraph 1. The frontal is placed been at a lower level, the rear one at a higher level. These are incorporated in the opposite sides (FIG. 7) of its fuselage, with the propellers gravity center coinciding with the air vehicle weight gravity center and the wing area surface center, connected to the fuselage and the adjacent wings by rafters (13) and with their front totally uncovered. Rear horizontal axial propeller is not required.

5. LIGHT AIR VEHICLE WITH SIMPLE SUPERSONIC PROPELLERS (Simple) This has its own takeoff capability and has one pair of simple supersonic propellers (FIGS. 8,9,10,11) as mentioned in the previous page in paragraph 2 but without the lifting capability of subparagraph 1.2, and without the circular openings with deflectors and obstruction vanes of subparagraph 1.3 and 1.4. The two simple supersonic propellers have to be incorporated on the opposite sides (FIG. 8) of its fuselage and are connected to it and to the adjacent wing by rafters (13) with their front totally uncovered and connected to the air vehicle motor by cogwheels, clutches and gear box.

BRIEF DESCRIPTION OF DRAWINGS

All dimensions are referred to the base of radius R.

FIG. 5. Cross section of composite supersonic propeller in the direction of motion.

FIG. 10. Cross section of simple supersonic propeller in the direction of motion.

The numbers in all figures refer to the following elements.

1. The upper convex semilens shaped surface of the propeller shell.
*2. The lower boundary of the propeller shell.
3. The propeller impeller.
*4. The external vertical very dense and of short width (3 mm) blades.
6. The internal tilted lifting blades.
7. The upper non rotating deflector vanes.
8. The lower non rotating deflector vanes.
*8. The front and side obstruction vanes.
*9. The rear obstruction vane.
*10. The propeller cog wheels.
*11. The propeller clutches.
*12. The propeller common gear box.
*13. The propeller and wing rafter.

DESCRIPTION OF PREFERRED EMBODIMENTS

The supersonic propeller is the evolution of the No 0120263 European, No 1396630 Russian and No 1721244 Japanese patents.

This propeller has nothing in common with conventional propellers, except their rotation The supersonic propeller is horizontal and based on the non vector Bernouilli Theorem $$P + p\frac{V^2}{2} = C$$

where the pressure P remains unchanged for any direction of equal speed.

That makes feasible the avoidance of any overpressure on the impact front area of streamlined fuselages, by adding to their front airflow a side speed by a rotating depression impeller.

Because the frontal depression is proportional to the rotation applied, it is easy to attain a frontal pressure lower than that of the rear separation region and produce a speed notion subsonic or even supersonic.

Wind tunnel tests defined that for a motion speed with a drag coefficient 0.6 an equal rotation speed of the supersonic propeller is required [table 1, page 2].

1. Supersonic Propellers

FIGS. 3 to 11

The text numbers correspond to the component numbers of the same Figures.

Figure 1:
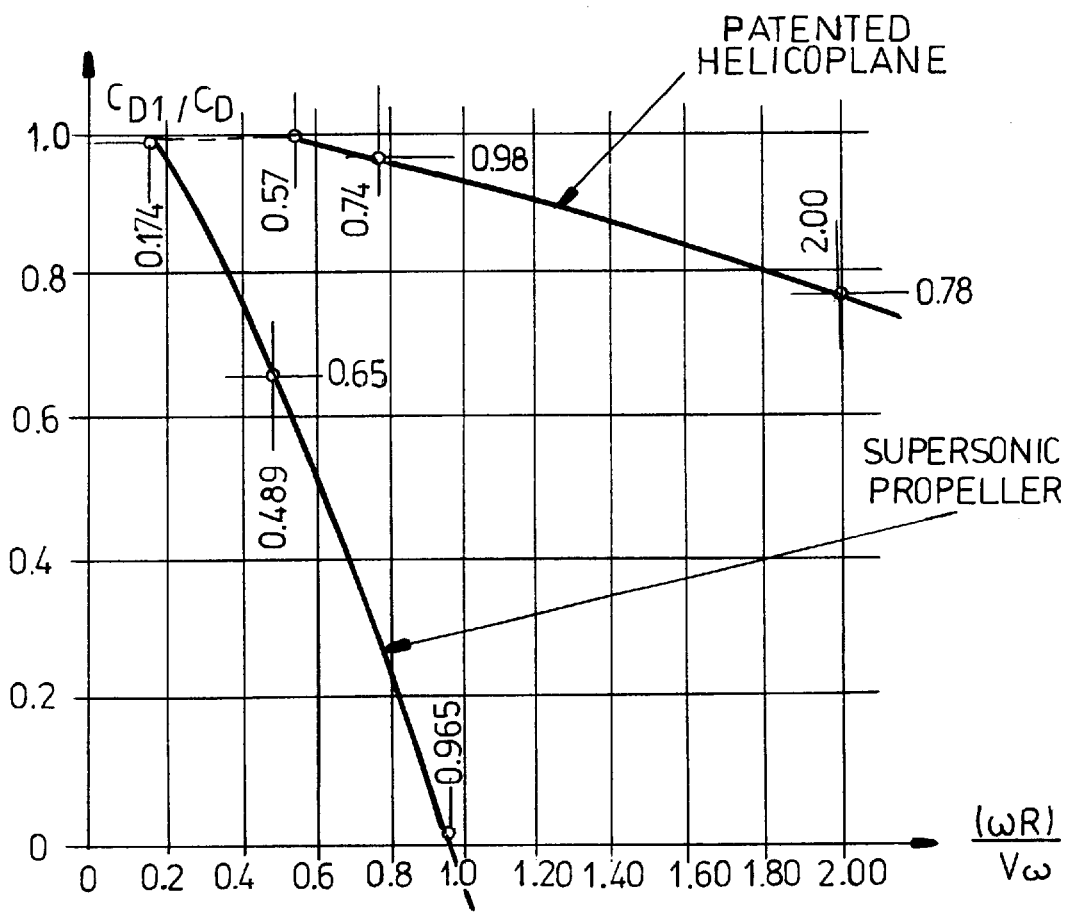
FIG. 1. Frontal depression diagram.
Figure 2A:
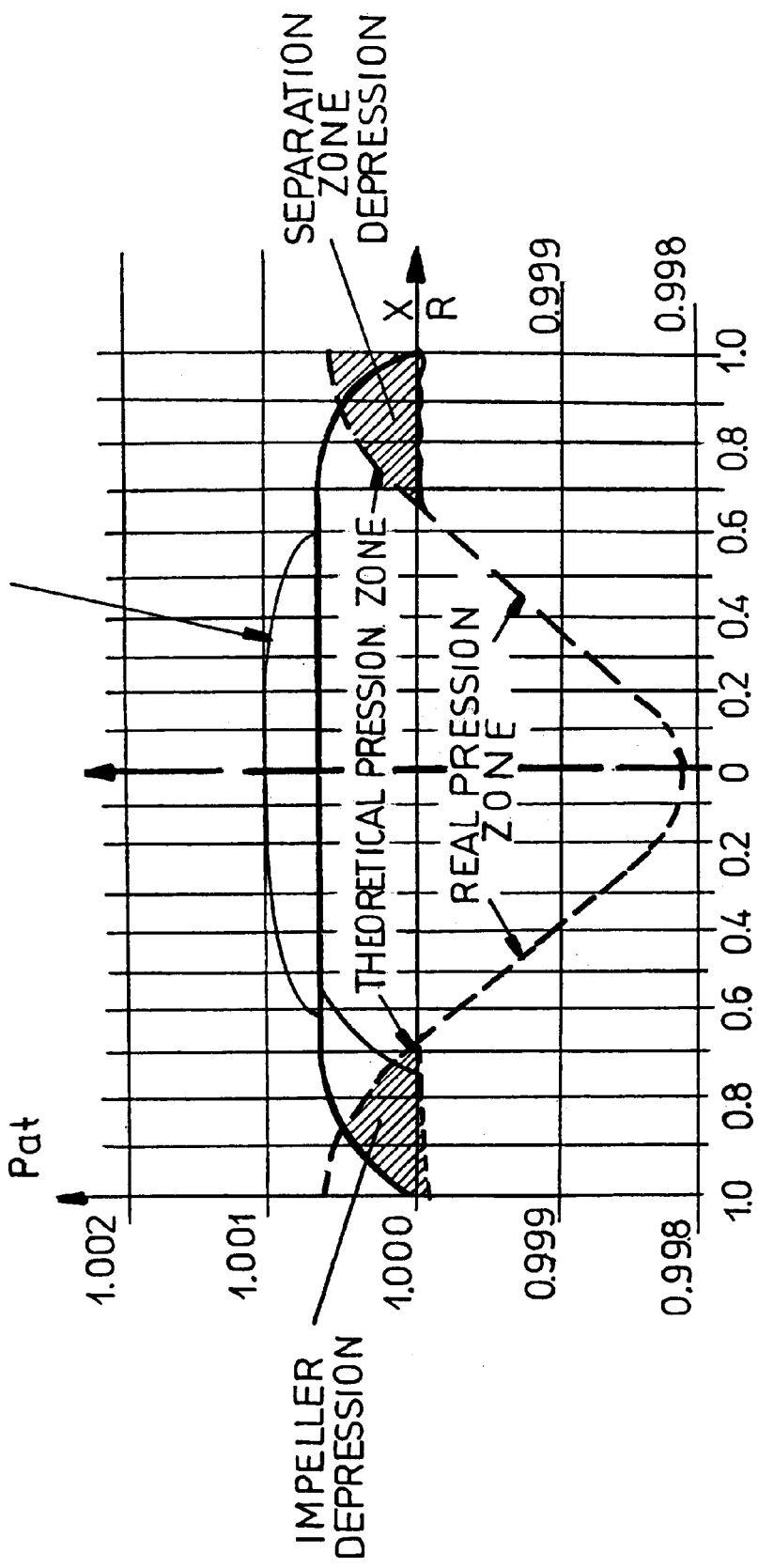
FIG. 2. Pression diagram of supersonic propeller.
Figure 2B:
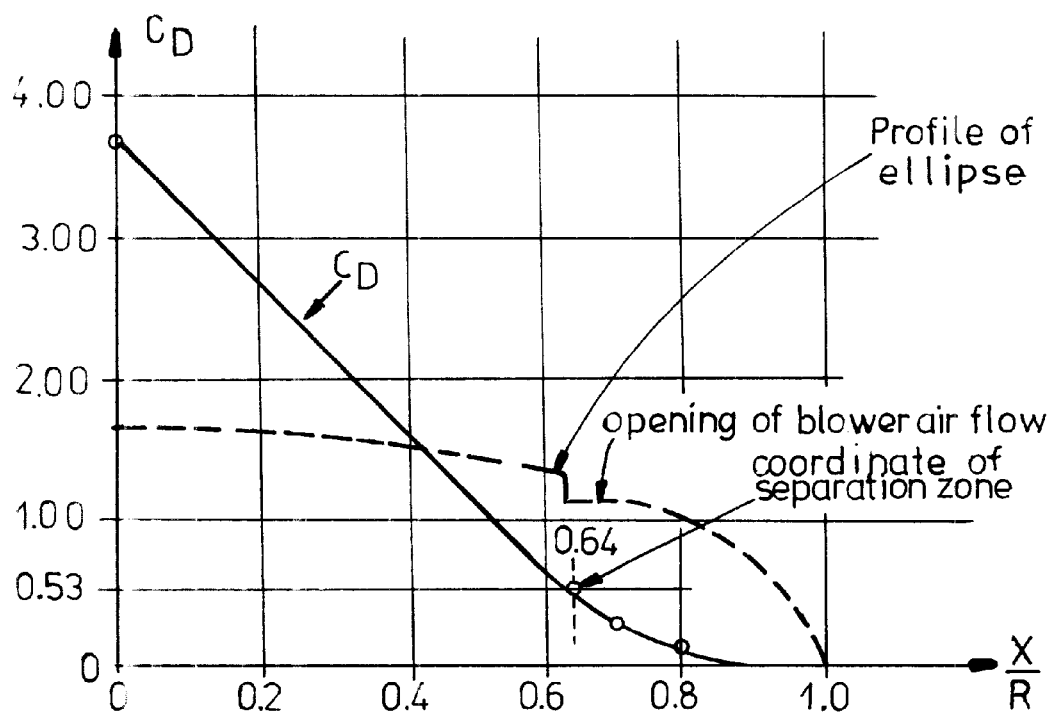
Figure 3A:
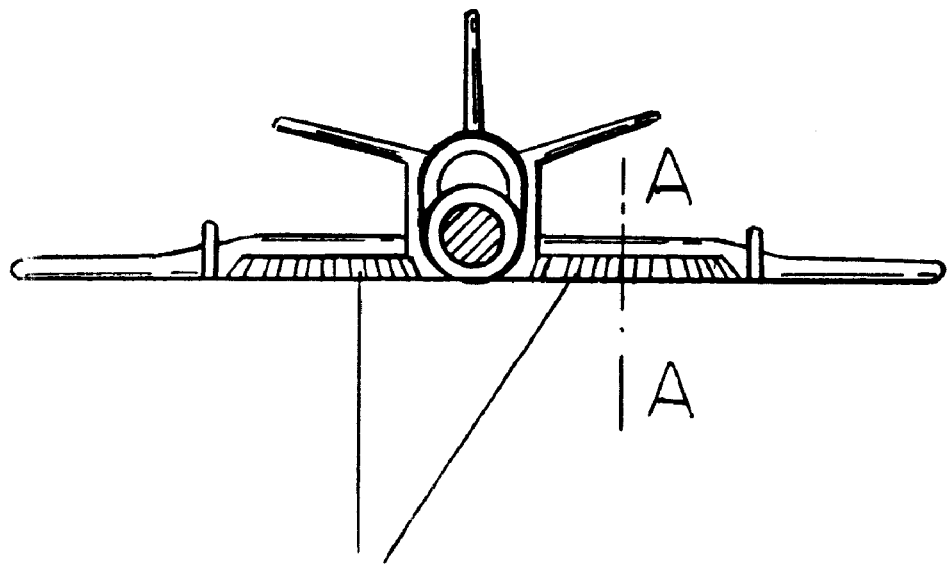
FIG. 3. Sketch of air vehicle with composite supersonic propellers.
Figure 4:
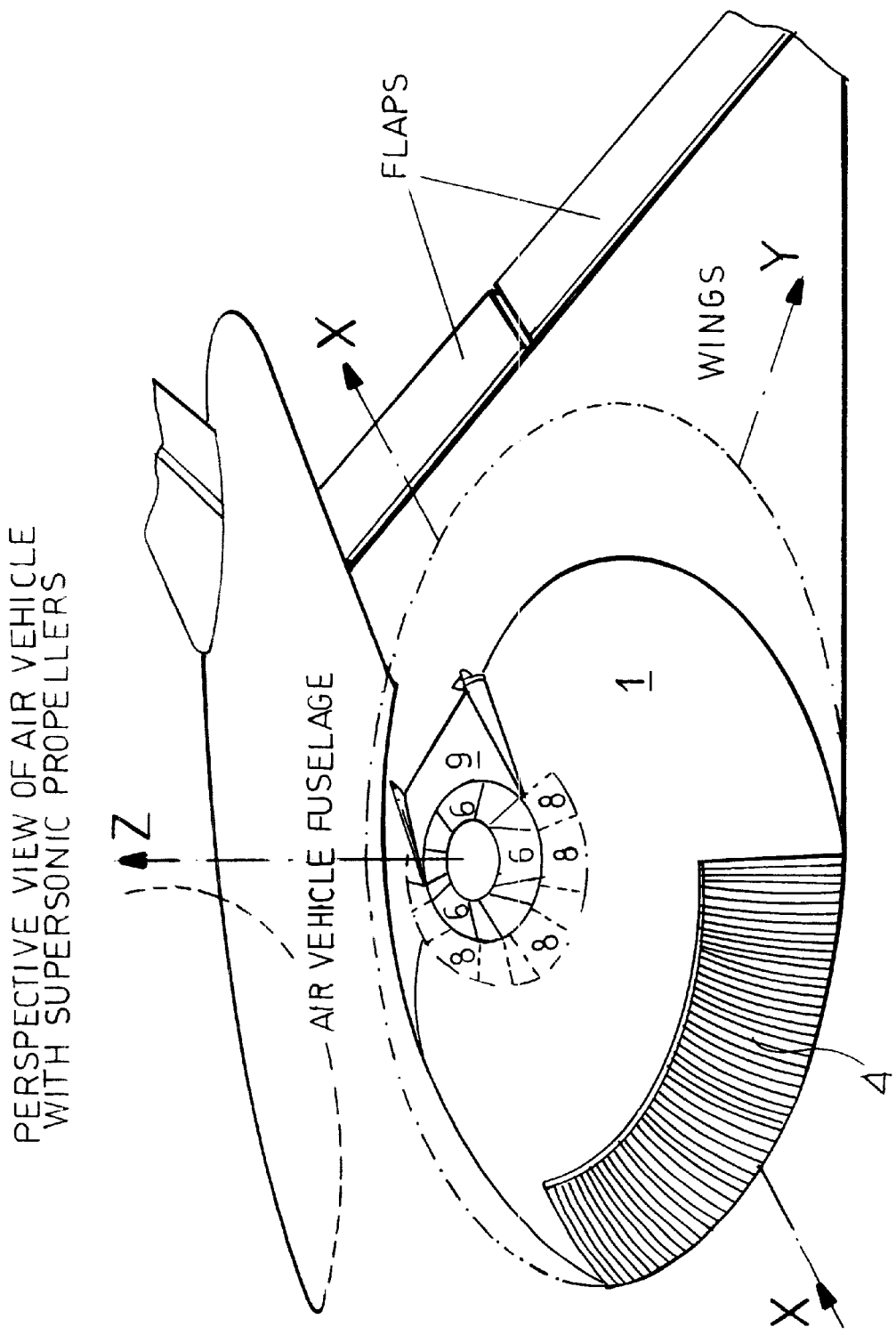
FIG. 4. Perpective view of air vehicle with composite supersonic propeller.
Figure 6A:
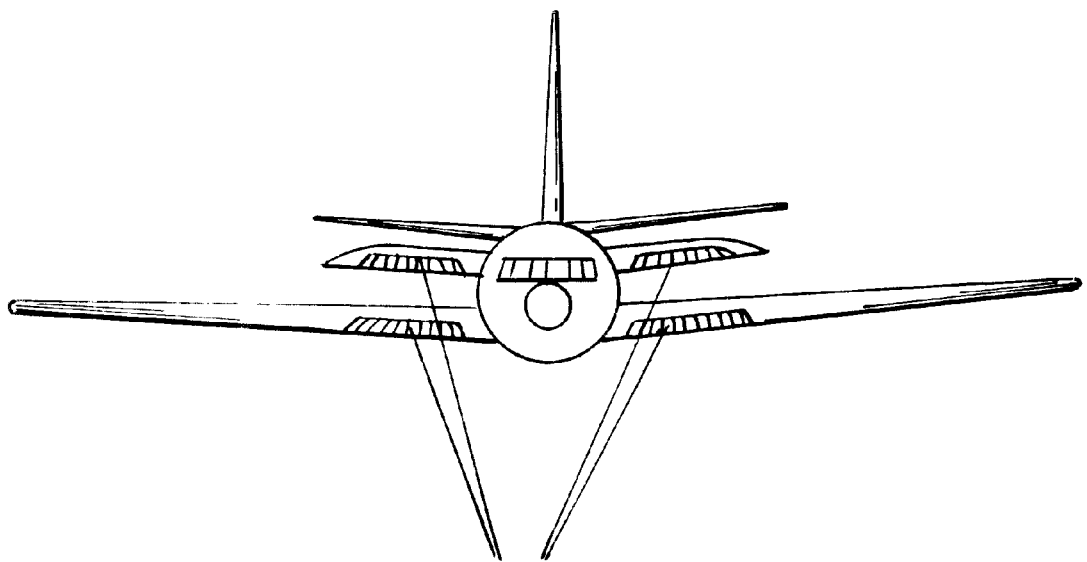
FIG. 6. Cross section of FIG. 5 normal to motion.
Figure 6B:
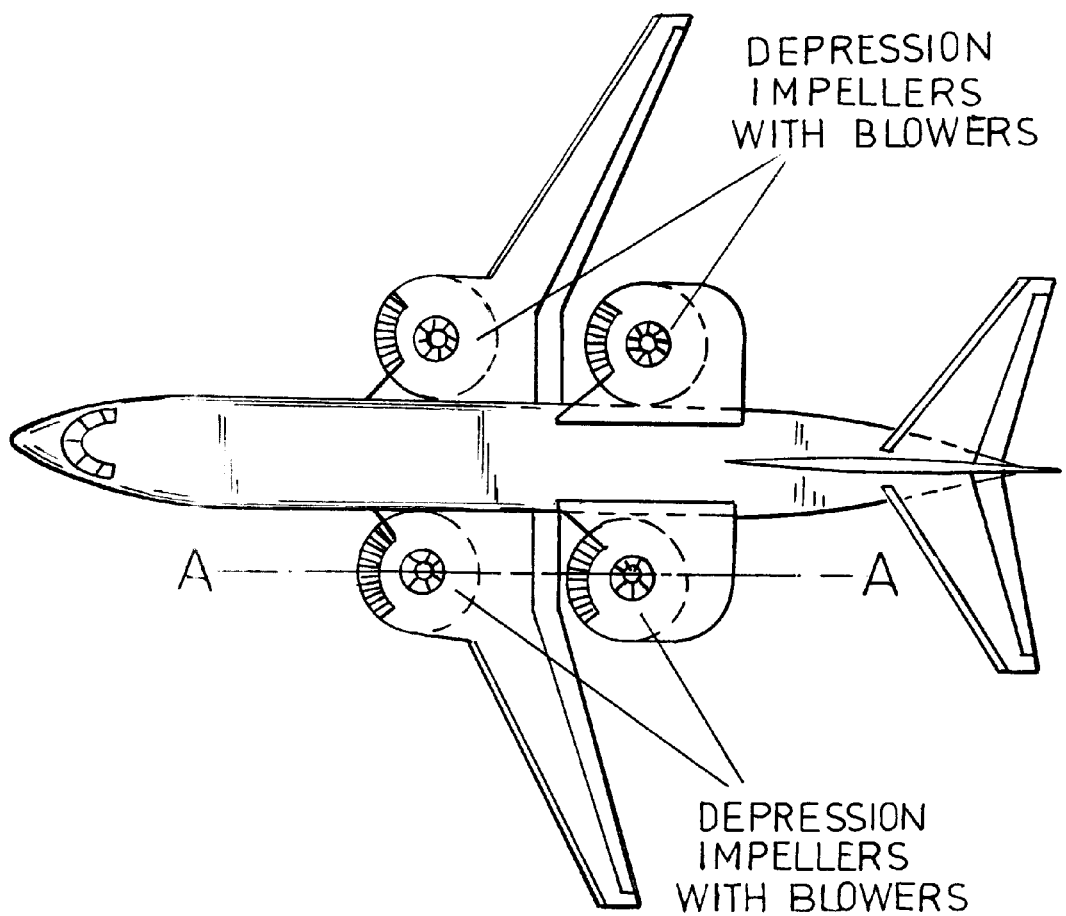
Figure 6C:
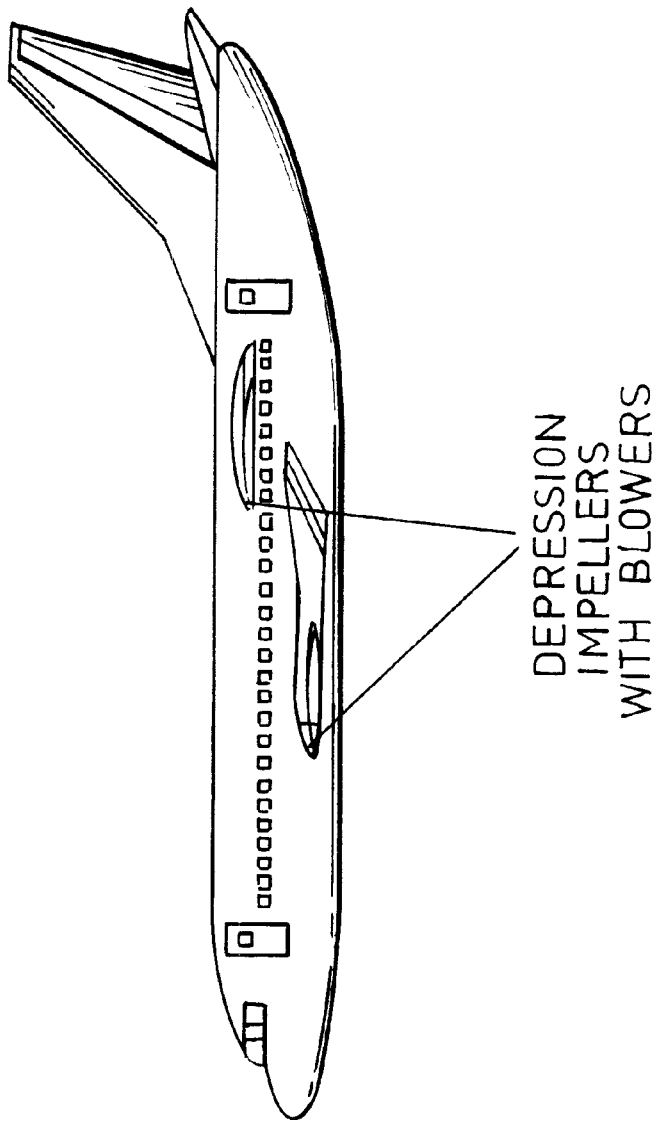
Figure 7A:
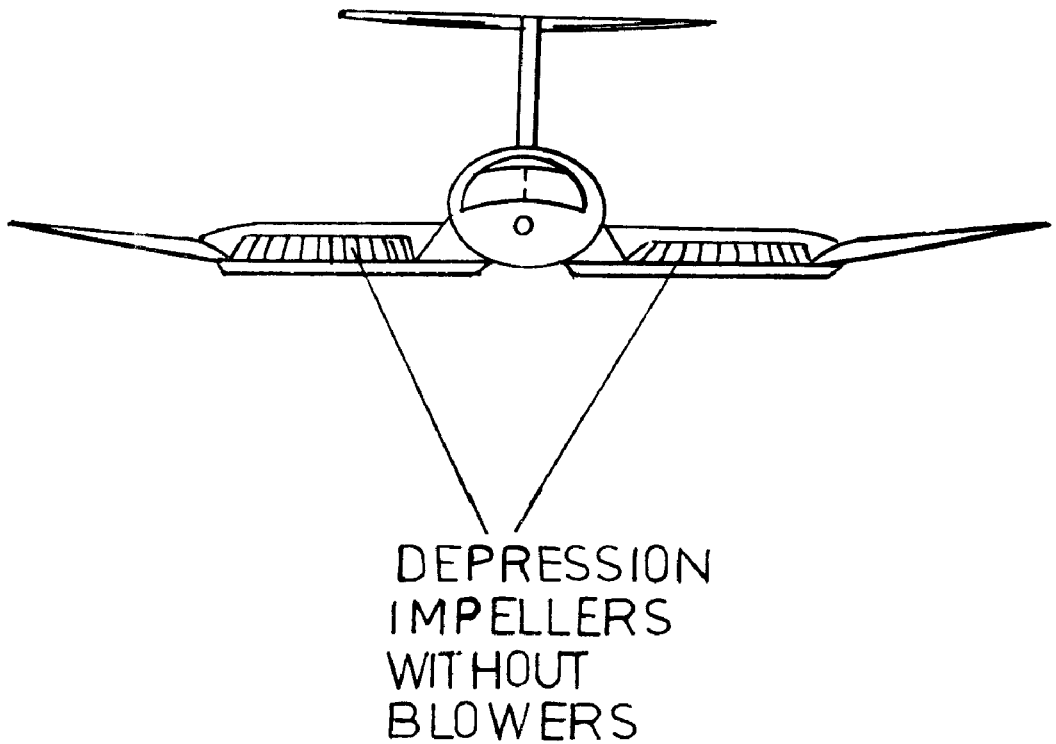
FIG. 7. Sketch of heavy air vehicle with composite supersonic propellers.
Figure 7B:
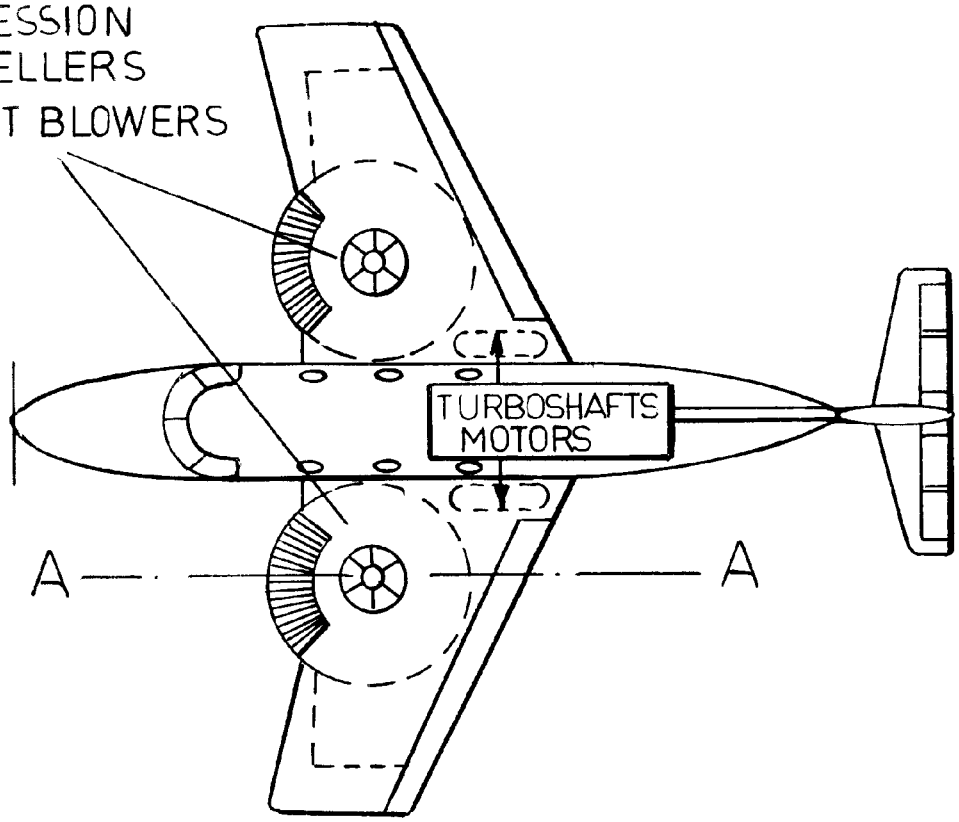
Figure 7C:
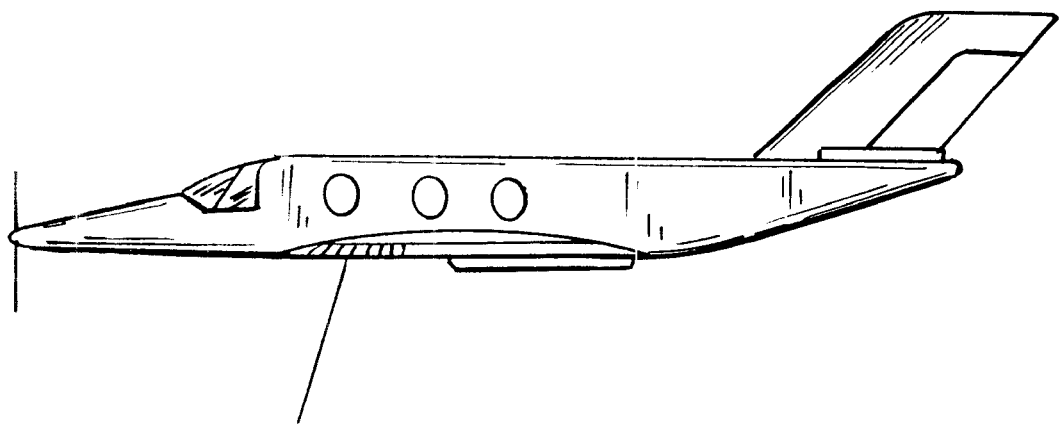
Figure 8:
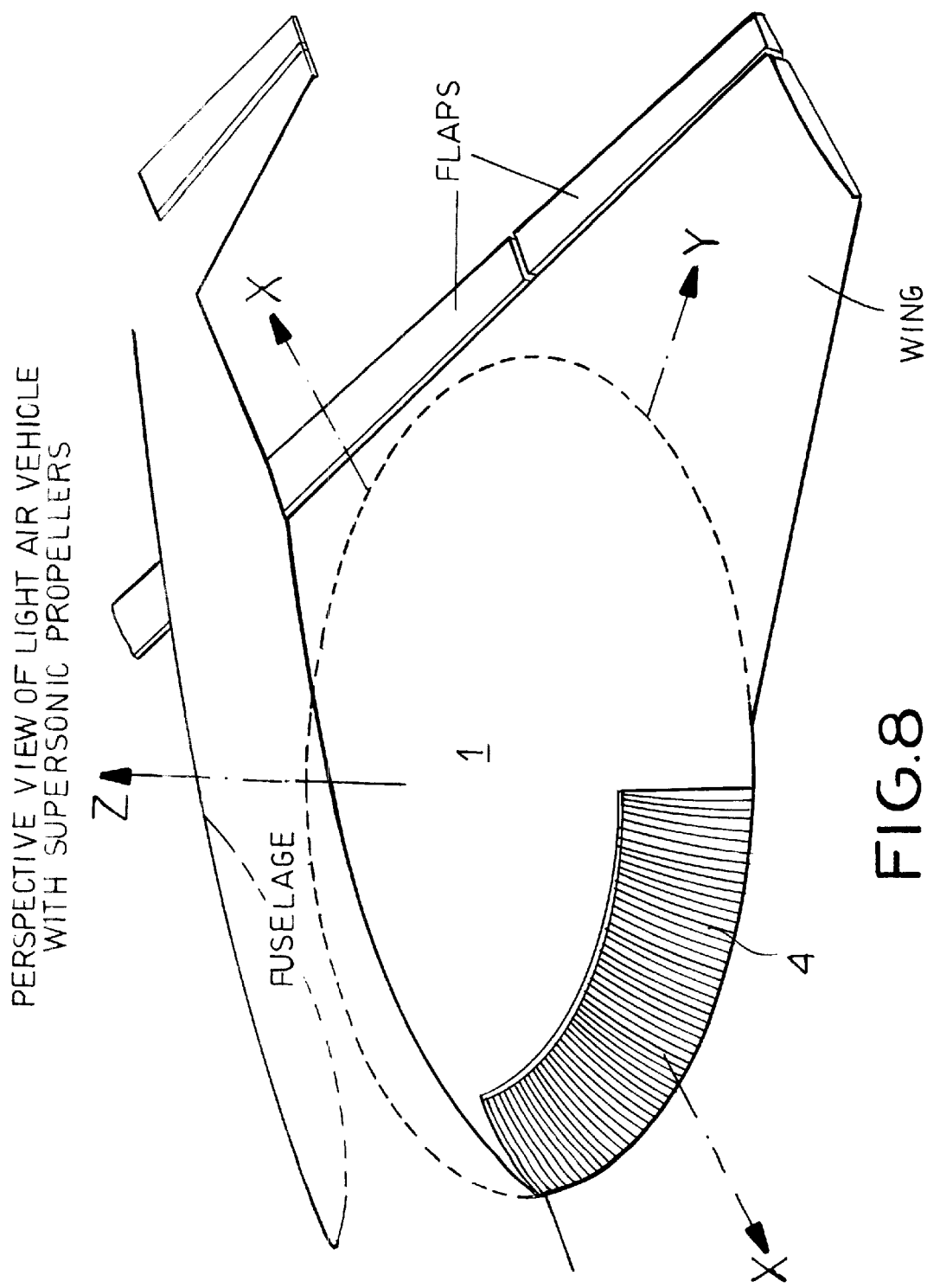
FIG. 8. Sketch of light air vehicle with simple supersonic propellers.
Figure 9B:
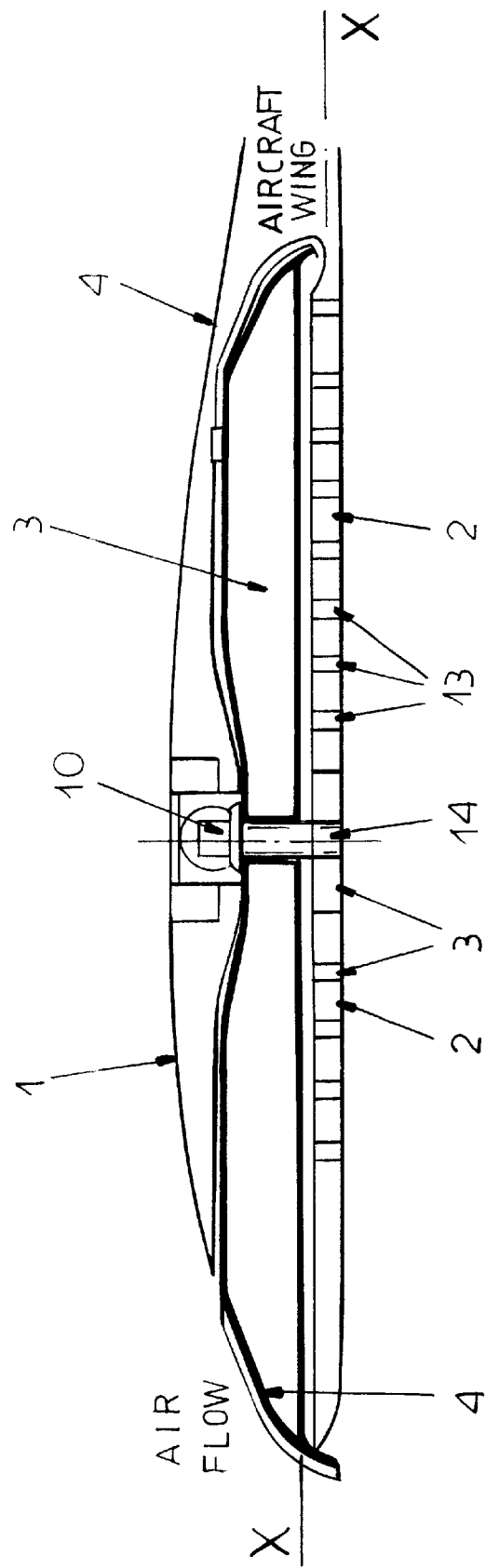
FIG. 9. Perspective view of light air vehicle with simple supersonic propellers.
Figure 9C:
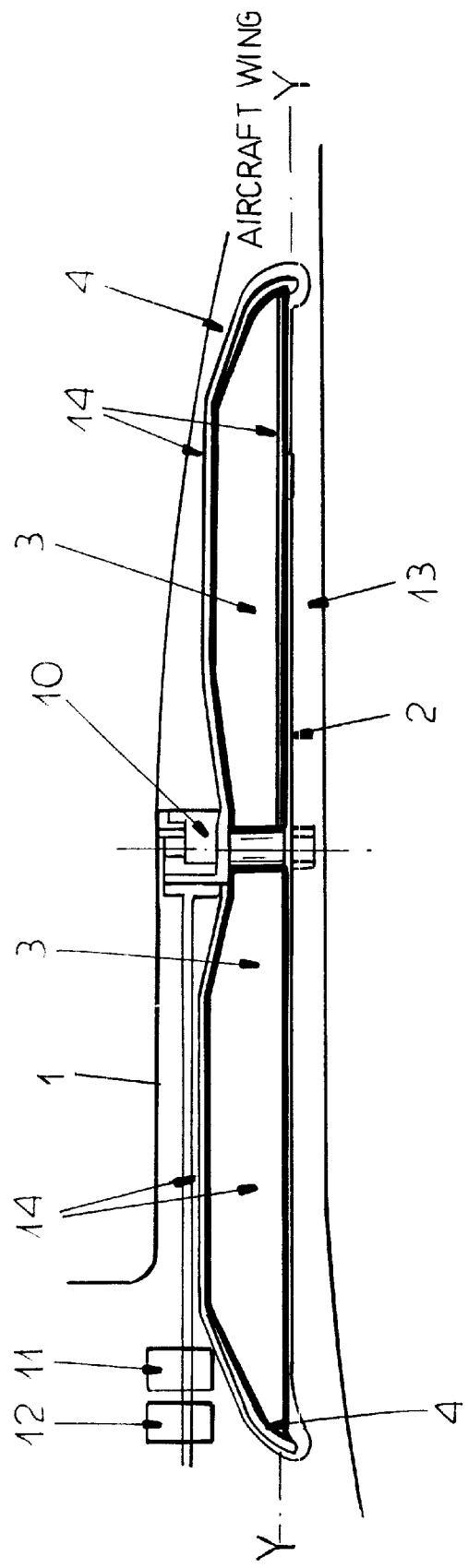
Figure 11:
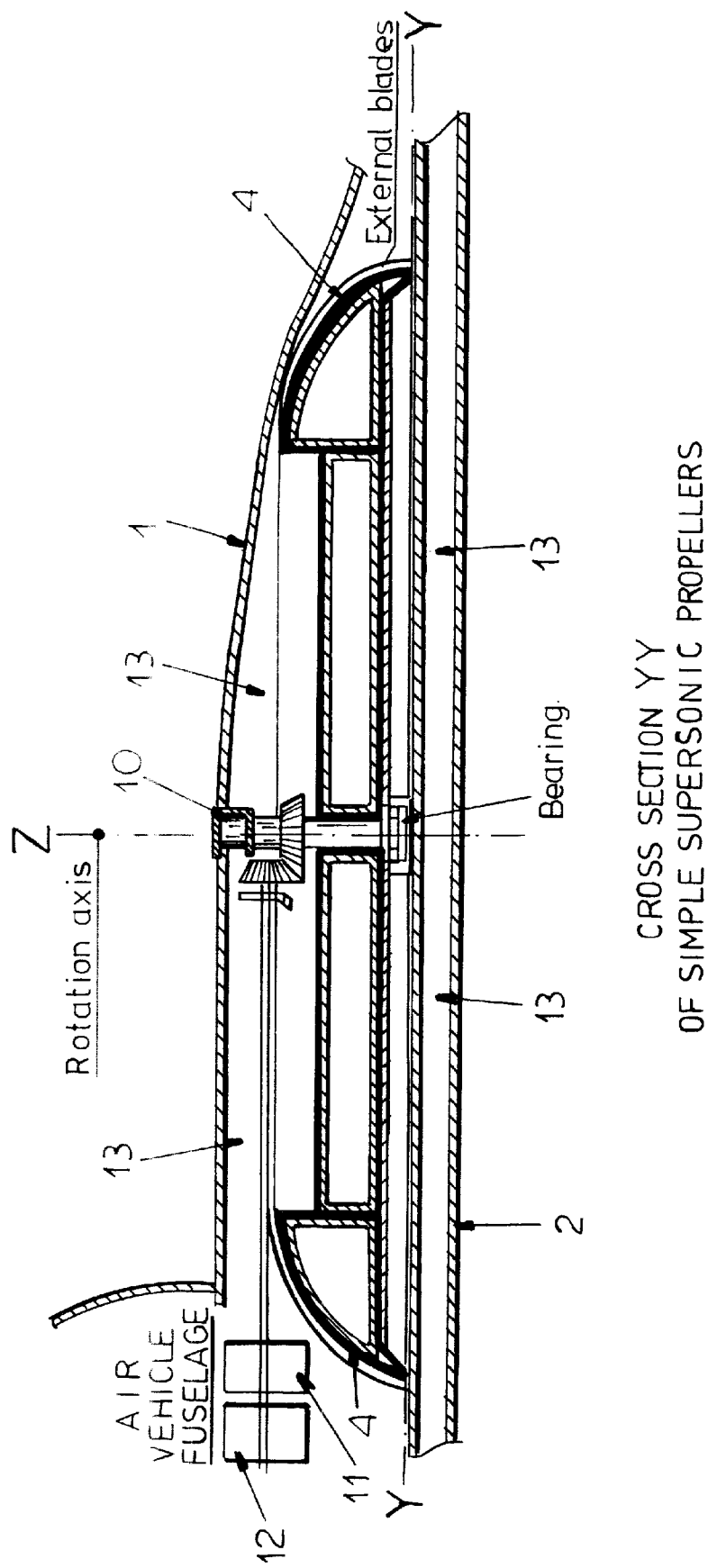
FIG. 11. Cross section of FIG. 10 normal to motion.

1.1. Shell (FIGS. 4,5,6)

The supersonic propeller is incorporated in a shell of thin profile and reduced drag with a convex semi ellipsoidal boundary (1) around a vertical axis, expressed by $$r^2 + k^2 z^2 = R^2$$

where K=3 to 5 and a light convex lower semi ellipsoidal boundary (2) around the same vertical axis, for including the connecting rafters of fuselage-shell-wings. This boundary (2) is expressed also by $r^2 + k_1^2 z^2 = R_1^2$ where K1=10 to 15 and R1=0.9R.

According to the Bernouilli theorem the drag force of the shell can be calculated from $$Fx = \int_0^{R/k} \int_{-\frac{\pi}{2}}^{+\frac{\pi}{2}} \rho \frac{1}{2} V^2 \, dy \, dz$$

but this drag is expressed also by the relation $$Fx = Cx\rho \frac{v^2}{2} \left(\frac{\pi R^2}{2x}\right)$$

where $$\left(\frac{\pi R^2}{2x}\right)$$

is the cross-section of the shell. The shell upper boundary is characterized by a large front opening, in preference.

$$\varphi = \text{from } -45° \text{ to } -45 \text{ and } z = O \text{ to } \frac{2}{3}\frac{R}{\kappa}$$

in the case the shell incorporates also a blower for vertical flight, take-off and landing, it is also characterized by the upper circular opening (6) close to the rotation axis with no rotating deflector vanes (to secure the vertical impeller blower air stream) and front, (8) side (8) and rear (9) obstruction vanes, for obstructing the vertical impeller blower air stream, when the air-vehicle wings are providing the required lift force making available all the motor power for increasing. the impeller rotation and the air vehicle speed accordingly.

Also the rear obstruction vane (9) re-instates the rear shell ellipsoid profile and decreases the drag force. The lower boundary is also characterized by a circular opening, close to its perimeter, with no rotating deflector vanes (7).

1.2. Impeller (FIG. 5 and FIG. 6)

The impeller is a rotor (3) rotating around a center axis supported by bearings, with a perimeter semi ellipsoid surface similar to that of the surrounding shell (1) and of height equal to the frontal shell opening (4) characterized by very dense and short width external vertical depression blades (4), and when the vertical flight is necessary the impeller is characterized also by internal tilted blades (5) terminated in the up and down to deflector vanes (6 and 7) at the shell (1,2) [FIG. 5].

Any of its external surface is rotating with speed $$(\omega r) = (\omega R)\frac{r}{R} = (\omega R)\left(1 - \frac{k^2 z^2}{R^2}\right)^{0.5} = (\omega R)(1 - n^2)^{0.5}$$

which through the shell frontal opening $\phi = \pm 45$ and z=0 to 0.22R, influence the external atmospheric tangential flow layer by adding to it, the side impeller velocity.

2. Horizontal Flying Characteristics 2.1. Horizontal Speed 2.1.1. The maximum rotation speed (ωR) with a margin of safety 44% respectively to the centrifugal breaking force of (ωR)=400 m/s is $$(\omega R) = (0.56)^{0.5} \times 400 = 300 \text{ m/s}$$

2.1.2. The minimum (ωR) has to be calculated with respect to the air vehicle self sustaining speed $$V_o = \left[\frac{W}{0.109 R^2 + 0.06B}\right]^{0.5} \text{ or}$$

$$(\omega R) = V_o \left[0.42\frac{A}{R^2} + 0.191\right]^{0.5}$$

Where

W is the total weight of the air-vehicle.

R is the supersonic propeller radius in m.

A is the cross-section of the air vehicle fuselage in $m^2$

B is the wing surface area in $m^2$ 2.1.3. For any intermediate rotation speed (ωR)

$$(\omega R) = \alpha V_o \left[0.21\frac{A}{R^2} + 0.191\right]^{0.5}$$

where α is the compressive air coefficient which for $V_o$=90 m/s; α=1 white for greater speeds it is increased from 1 to 1.70.

2.1.4. Speed studies presuppose that, $$(\omega R) = \frac{C^{0.5}}{0.712} V$$

where $c_x$ is the drag, coefficient of the air-vehicle.

2.1.5. Maximum horizontal speed
This is calculated according the formula $$V_{max} = \left[a\frac{C_F}{C_D}\right]^{0.5}(\omega R) = 860 \text{ m/s} = 3 \text{ Mach}$$

where $C_D=0.23$ is the aircraft drag coefficient, $C_F=0.5$ is coefficient of frontal depression and $\alpha=3.1$ is the compressibility factor which is augmented with $(\omega R)$ and the altitude.

2.2. Horizontal Pulling Force
The frontal motioning force of supersonic propeller is calculated according the formula $$F_F = 0.492\rho\frac{(\omega R)^2}{2}\left(\frac{\pi R^2}{2k}\right) = \text{from 150 to 33000 Kg}$$

Which are equal or superior to that of the turbofans. Because the frontal depression cannot be greater than the pressure difference between the tangential air layer and the surrounding atmosphere for $V<0.983$ $(\omega R)$ $$F_F = 0.509\frac{V^2}{2}\left(\frac{\pi R^2}{2k}\right)$$

Which means that the propeller cannot provide the starting motion unless it is provided with internal lifting blower blades.

2.3. Horizontal Pulling Power
The strong rear impulsion of conventional aircraft's is substituted by the very limited frontal and lateral impulsion of the supersonic propeller, which consequently require a very restricted motor power.

2.3.1. Conventional
For an air-vehicle with $$\frac{\pi R^2}{2k}$$

cross section and drag coefficient at last 0.1 and conventional method of motion, its drag is $$F_X = C_D\rho\frac{V^2}{2}\left(\frac{\pi R^2}{2k}\right) = 0.1 \times 0.12\frac{V^2}{2}\left(\frac{\pi R^2}{2k}\right) = 0.006 \text{ V}\left(\frac{\pi R^2}{2k}\right)$$

And with a speed of rear impulse at least 1.2V the required motor power is $$P_l = \frac{0.006 \times 1.2}{75}V^3\left(\frac{\pi R^2}{2k}\right) = 96 \times 10^{-6}V^3\left(\frac{\pi R^2}{2k}\right) = 50R^210^{-6}R \text{ } V^3$$

And for R=3 m $$P_1 = 150 \times 10^{-6}R^2V^3 \quad \text{.HP}$$

2.3.2. Theoretical
A rotating impeller with 4 mm width blades rotates not only the layer of 4 mm, but because of the air viscosity, an additional layer of equal rotation thickness of 3 mm. Consequently the rate of radial air flow is $$Q=\pi/2R(0.004+0.003)V\alpha=0.011RV\alpha$$

and its torque $$M=\rho Q(\omega R)R=0.12 \times 0.011R^2(\omega R)V\alpha$$

or $$M=0.00132R^2(\omega R)V\alpha$$

and the required power $$P_T = \frac{\omega M}{75} = 17,6 \times 10^{-6}R(\omega R)^2V_\infty \text{ HP}$$

2.3.3. Experimental
According to air tunnel tests on the impeller model performed at National Technical University of Athens during Feb. 5, 1994 the required power is provided by the relationship.

$$P_M = 18.13 \times 10^{-6}R(\omega R)^2V\alpha \quad \text{HP}$$

3. Vertical Flying Characteristics
3.1. Lifting Force
The lift force of internal impeller space result from the overpression of the lower circular opening and the depression of the upper circular opening and the impulsion of the air drawn from above and expelled down, functioning as a radial-flow or centrifugal propeller.

The vertical resultant of there overpression and depression and the lift by impulse on the air flow speed with deflection at levels 1 and 2 provide a lift force for each supersonic propeller $$F_L = 0.1656R^2(\omega R)^2$$

3.2. Lifting Power
The rate of vertical flow per second is $$Q2=\pi R_2 b_0 V_{J02}=0.459R^2(\omega R)$$

The retroactive torque $$M=\rho Q[R_2V_{\tau 2}-R_1V_{\tau 1}]=0.0409R^3(\omega R)^2$$

and the respective power $$P_L = \omega\frac{M}{75} = 0.000545\left(\frac{\rho}{\rho_0}\right)R^3(\omega R)^3 HP$$

and the engine magnitude is to be $$P_{LN}=0.0006R^2(\omega R)^3 \quad \text{HP}$$

4. Fuel Economy
The side impulsion of the tangential thin air-layer by the supersonic propeller is obviously smallest, when compared to the turbofan gas exhaust impulsion, and the same happens with the respective power requirement, as be derived from the aerodynamic theory and was proven by wind tunnel tests, and it is to be noted, that propeller's efficiency increases in a turbulent or supersonic environment.

Using the figures of previous paragraphs 2.3.1 and 2.3.3 for a low speed of V=50 m/s and the respective equal rotation speed $(\omega R)=50$ m/s is found out by tests. The expected economy is $$F.E. = \left[1 - \frac{P_M}{P_V}\right]100\% = \left[1 - \frac{18,13}{150}\right]100\% = 88\%$$

5. Start—Flight
The initial flight of the propeller air vehicle is possible:
5.1. Automatically
By internal tilted blades of the propeller operating as a blower with a rotation speed corresponding to the vehicle wing gliding speed.

For this purpose two circular openings are provided, one is placed above and close to the axis of rotation and a second below close to the perimeter of the base.

After the gliding speed is attained the upper opening is obstructed and all the power is available for increasing the rotation of the propeller.

The computation of such blowers are included on a separate text with a performance coefficient n=70%.

The vertical take-off and vertical landing and the horizontal supersonic speed are applicable to all kinds of air vehicle as shown in the same text.

5.2. Independent

With an independent propeller for take-off by runway run and simultaneous rotation of the two impellers.

After the take-off, the propellers are released and the impellers are rotated faster and so the speed of air vehicle is increased.

This is applicable on small tourist aircraft's and on U.A.V.

6. Flight Pattern of Aircraft's with Supersonic Propellers Flying Procedure

The air vehicles incorporating supersonic propellers fly according the following phases based on the solution of the horizontal and the vertical forces equations:

6.1. Vertical Flight

This lasts 10 to 20 seconds with a vertical acceleration 2 to 1 m/s² until the air vehicle attains an altitude 120 to 300 m.

6.2. Initial Horizontal Flight

The air vehicle is then tilted forward 10 to 20 degrees, by closing the frontal obstructor vanes and the horizontal speed is initiated. The first flight of 3 to 7 seconds produced by the tilted lifting propeller and the air vehicle weight occurs 6.3. Accelerating speed until gliding one.

After the previous phase the frontal depression intervenes and produces an accelerating speed of 0.3 to 2 g until the speed attains the gliding speed which is generally 100 to 200 m/s.

This phase lasts about 60 sec during which the altitude of 6.000 ft is attained.

6.4. Increase of Availability Power

When the fuselage gliding speed is attained, the propeller vertical air flow is no longer required and it is obstructed by the respective vanes. Consequently the power required initially for lifting of the air vehicle becomes available for increasing the propeller rotation which decreases the frontal depression and consequently encrease the horizontal speed.

6.5. Farther Enhanced in Speed

By reestablishing the semi ellipsoidal profile of the fuselage over the rear part of its circular opening the impeller fuselage drag coefficient is decreased from about 0.53 to 0.15 or less. Accordingly without changing the rotation speed of the propeller the speed increases about 80%.

6.6. Farther Increases in Speed Including Supersonic Speeds

By increasing the propeller's rotation speed its respective horizontal speed is increased and the figures attained are the following:

Rotation speed (ωR)=100 to 300 m/s

Horizontal speed V=1.5 to 2.5 Mach

Acceleration 0.5 to g but possibility of 8 g exist

Altitude of 30,000 ft is attained after two minutes

Maximum speed is attained after 3 minutes 6.7. Landing Procedure

The descent and landing are performed by reversing the above phases.

I claim:

1. A supersonic propeller (FIGS. 9, 10, 11) providing horizontal subsonic or even supersonic speed to its propelling air vehicle, but without lifting it capability, constituted by an horizontal streamlined shell of thin profile of reduce drag, with upper convex semi ellipsoid boundary (1) and flat lower boundary (2) with a frontal opening (4) ±45° horizontally and the vertically lower two third of its high, incorporating a rotating horizontal impeller of surface similar to that of the shell of height equal to the frontal opening, characterized on its external surface by vertical depressing blades of the height of the impeller tangential thin air layer and distanced by the same size.

2. A supersonic propeller (FIGS. 4, 5, 6) providing horizontal subsonic or even supersonic speed and simultaneously a vertical lifting flight to its propelling air vehicle, constituted by an horizontal streamlined shell of thin profile of reduced drag, with upper convex semi-ellipsoid boundary (1) and a flat lower boundary (2) with a frontal opening (4) ±45° horizontally and vertically the lower ⅔ of its height and additionally two circular openings, the upper around the central axis on the convex boundary (2) and the lower close to the perimeter of the lower flat boundary (2), incorporating a rotating horizontal impeller of external surface similar to that of the shell of height equal to the frontal opening characterized on its external surface by vertical depressing blades of the height of the impeller tangential thin air layer and distanced by the same size and furthermore a radial flow blower with tilted centrifugal blades (5) in the internal surface on the said impeller (3) which blades are equipped in their two ends with non rotating deflectors (6) securing the vertical entry and exit of the lifting air flow, and with obstruction vanes (5) stopping the vertical air flow when is unnecessary.

3. A supersonic air-vehicle (FIGS. 3, 4) disposing a pair of composite supersonic propellers as in claim 2 for vertical take off and the vertical landing, incorporated on the opposite sides (FIG. 3) of its fuselage with their front totally uncovered and their gravity center coinciding with the air-vehicle weight gravity center and the wing area surface center, and their rotation in opposite direction, connected to the air-vehicle motors by cog-wheels (10), clutches (11) and gear box (12) and supported by rafters (13).

4. A heavy supersonic air-vehicle (FIGS. 4, 7) disposing two pairs of composite supersonic propellers as in claim 2 for vertical take off and the vertical landing incorporated on the opposite side (FIG. 7) of its fuselage, the frontal one in a lower level and the rear one on a higher level, with their front totally uncovered and their gravity center coinciding with the air vehicle weight gravity center and the wing area surface center, and the rotation of each pair in opposite direction both connected to the air-vehicle motors by cog-wheels (10), clutches (11) and gear box (12) and supported by rafters (13).

5. A supersonic air-vehicle with its independent take-off capability (FIGS. 8, 9) disposing a pair of supersonic propellers as in claim 1 incorporated on the opposite sides (FIG. 8) of its fuselage with their rotation in opposite directions and their front totally uncovered, connected to the air-vehicle motor by cogwheels (10) clutches (11) and gear box (12) and supported by rafters (13).

6. An aircraft comprising a fuselage and at least one pair of supersonic propellers mounted on said fuselage, each of said supersonic propellers comprising:

a thin-profile horizontally extending streamlined low-drag shell having an upper upwardly convex semiellipsoidal surface and a flat bottom surface, said shell being open forwardly over a window in the form of an arc extending about 90° around a vertical axis of the propeller and upwardly to about two-thirds of a height of the shell from said bottom surface;

a horizontal impeller rotatable about said axis, wholly received in said shell and formed with a circular array of closely spaced vertical blades of a thickness of about 4 mm having heights equal at least to a height of said opening and exposed through said opening, said blades being spaced apart by substantially the same magnitude as said thickness and having external surfaces conforming generally to said upper surface;

means for rotating said impeller about said axis to generate a horizontal pulling force upon said fuselage whereby said aircraft is propelled forwardly.

7. The aircraft defined in claim 6 wherein said upper surface is formed around said axis with an inlet into said shell, said bottom surface is formed along a periphery thereof with an outlet from said shell, and said impeller is formed with passages equipped on their ends with nonrotating deflectors generating a flow of air from said inlet to said outlet and lift for said aircraft upon rotation of said impeller, said inlet being provided with vanes for stopping flow of air from said inlet to said outlet.

8. The aircraft defined in claim 7 wherein the aircraft is provided with two of said supersonic propellers on opposite sides of said fuselage and having a joint center of gravity coinciding with a center of gravity of said fuselage, the propellers on opposite sides of said fuselage rotating in opposite directions.

9. The aircraft defined in claim 7 wherein the aircraft is provided with two pairs of said supersonic propellers on opposite sides of said fuselage, said pairs of said supersonic propellers including a forward pair located at a lower level than a rearward pair the propellers on opposite sides of said fuselage rotating in opposite directions.

10. The aircraft defined in claim 6 wherein said shell is formed with at least one beam extending along said bottom surface and supporting a bearing, said impeller being journaled in said bearings, said upper surface being provided with another bearing, said means for rotating said impeller including at least one turbomotor connected by gear wheels and shafts with said impeller.

* * * * *